United States Patent
Lee et al.

(10) Patent No.: US 10,088,368 B2
(45) Date of Patent: Oct. 2, 2018

(54) MOBILE DEVICE HAVING TEMPERATURE SENSOR AND METHOD OF OPERATING SAME

(71) Applicants: Samsung Electronics Co., Ltd., Gyeonggi-do (KR); Partron Co., Ltd., Gyeonggi-do (KR)

(72) Inventors: Min-hyoung Lee, Gyeonggi-do (KR); Tae-won Kim, Gyeonggi-do (KR); Jae-geol Cho, Gyeonggi-do (KR); June-hyeon Ahn, Gyeonggi-do (KR); Jea-hyuck Lee, Gyeonggi-do (KR)

(73) Assignees: Samsung Electronics Co., Ltd (KR); Partron Co., Ltd (KR)

( * ) Notice: Subject to any disclaimer, the term of this patent is extended or adjusted under 35 U.S.C. 154(b) by 282 days.

(21) Appl. No.: 14/925,306

(22) Filed: Oct. 28, 2015

(65) Prior Publication Data
US 2016/0116348 A1  Apr. 28, 2016

(30) Foreign Application Priority Data
Oct. 28, 2014  (KR) ........................ 10-2014-0147633

(51) Int. Cl.
| | |
|---|---|
| *G01J 5/00* | (2006.01) |
| *G01K 7/00* | (2006.01) |
| *G01K 1/08* | (2006.01) |
| *G01K 1/14* | (2006.01) |
| *G01K 13/04* | (2006.01) |
| *G01J 5/10* | (2006.01) |
| *G01K 13/00* | (2006.01) |

(52) U.S. Cl.
CPC .............. *G01J 5/10* (2013.01); *G01K 13/002* (2013.01)

(58) Field of Classification Search
CPC .... G01J 5/00; G01K 7/00; G01K 1/08; G01K 1/14; G01K 13/04; H04N 1/00307
See application file for complete search history.

(56) References Cited

U.S. PATENT DOCUMENTS

| | | | | |
|---|---|---|---|---|
| 8,838,037 | B2 * | 9/2014 | Niederberger | .......... H04M 1/21 |
| | | | | 370/338 |
| 9,438,713 | B2 * | 9/2016 | Lee | ..................... H04M 1/0266 |
| 2005/0208903 | A1 * | 9/2005 | Sakamoto | ............. H04M 19/04 |
| | | | | 455/90.3 |
| 2007/0099650 | A1 * | 5/2007 | Brunstrom | .......... H04M 1/0202 |
| | | | | 455/550.1 |
| 2007/0130479 | A1 * | 6/2007 | Price | ........................ G06F 1/26 |
| | | | | 713/300 |

(Continued)

FOREIGN PATENT DOCUMENTS

| | | | |
|---|---|---|---|
| CN | 2755876 Y | * | 2/2006 |
| CN | 201542619 U | * | 8/2010 |

(Continued)

*Primary Examiner* — Gail Kaplan Verbitsky
(74) *Attorney, Agent, or Firm* — The Farrell Law Firm, P.C.

(57) ABSTRACT

A mobile device and a method thereof are provided. The mobile device includes a display configured to display an image; a metal bezel surrounding an outer perimeter of the display; a temperature sensor configured to measure a temperature of an object via the metal bezel; and a controller configured to control the display to output the temperature measured using the temperature sensor.

6 Claims, 17 Drawing Sheets

(56) References Cited

U.S. PATENT DOCUMENTS

| | | | |
|---|---|---|---|
| 2008/0239091 A1* | 10/2008 | Soga | H04N 5/217 348/222.1 |
| 2011/0257546 A1 | 10/2011 | Gozzini et al. | |
| 2012/0129580 A1* | 5/2012 | Tam | G01S 7/4813 455/575.1 |
| 2012/0182222 A1* | 7/2012 | Moloney | G06F 3/0487 345/173 |
| 2012/0231841 A1* | 9/2012 | Niederberger | H04M 1/21 455/556.1 |
| 2014/0138545 A1* | 5/2014 | Klinghult | G01J 5/10 250/342 |
| 2014/0274217 A1* | 9/2014 | Lee | H04M 1/0266 455/566 |
| 2015/0279187 A1* | 10/2015 | Kranz | G08B 21/0415 340/539.12 |
| 2016/0026768 A1* | 1/2016 | Singh | G06F 19/322 705/3 |
| 2016/0212252 A1* | 7/2016 | Parker | H04B 1/3888 |
| 2016/0277053 A1* | 9/2016 | Wong Chee | H04B 1/3888 |
| 2017/0026069 A1* | 1/2017 | Kim | H04B 1/3888 |

FOREIGN PATENT DOCUMENTS

| | | | |
|---|---|---|---|
| CN | 202334644 U | * | 7/2012 |
| CN | 202723836 U | * | 2/2013 |
| CN | 202859096 U | * | 4/2013 |
| CN | 202918344 U | * | 5/2013 |
| CN | 103139345 A | * | 6/2013 |
| CN | 203563111 U | * | 4/2014 |
| CN | 103841238 A | * | 6/2014 |
| DE | 20120615 U1 | * | 3/2002 |
| EP | 2887033 A1 | * | 6/2015 |
| JP | 2006148983 A | * | 6/2006 |
| JP | 4895217 | | 3/2012 |
| KR | 1020080073571 | | 8/2008 |
| KR | 1020140071596 | | 6/2014 |
| WO | WO201371664 A1 | * | 5/2013 |

* cited by examiner

MOBILE DEVICE HAVING TEMPERATURE SENSOR AND METHOD OF OPERATING SAME

PRIORITY

This application claims priority under 35 U.S.C. § 119(a) to Korean Patent Application No. 10-2014-0147633, filed on Oct. 28, 2014, in the Korean Intellectual Property Office, the entire content of which is incorporated herein by reference.

BACKGROUND

1. Field of the Disclosure

The present disclosure relates generally to mobile devices, and more particularly, to mobile devices including a temperature sensor and methods of operating the mobile devices.

2. Description of the Related Art

As attention has recently been increasingly directed towards health, techniques for incorporating functions of checking health conditions into mobile devices, such as easy to hold smartphones, have been actively developed for efficient health management. For example, techniques that combine various functions of a blood pressure gauge, a blood glucose meter, a body fat measuring tool, etc. with a smartphone are being developed. There is also a need for mobile devices that have a built-in function of measuring a body temperature, since the body temperature is used as a basis for diagnosing various types of disease.

Temperature measuring techniques are classified into contact-type temperature measuring methods and noncontact-type temperature measuring methods, according to whether a temperature measuring device is in contact with an object whose temperature is to be measured. Examples of contact-type temperature measuring methods include measurement via a temperature sensor using a thermal electromotive force, measurement using a property in which electrical resistance of a semiconductor changes with temperature, etc. Examples of noncontact-type temperature measuring methods include measurement of heat radiated by an object, measurement of a photoelectric current generated when heat radiated by an object is converted via a photoelectric tube, measurement of infrared radiation emitted by an object, etc.

SUMMARY

The present disclosure has been made to address at least the problems and disadvantages described above, and to provide at least the advantages described below.

Accordingly, an aspect of the present disclosure is to provide mobile devices including temperature sensors that facilitate simple and accurate measurement of temperature by a user.

According to an aspect of the present disclosure, a mobile device is provided. The mobile device includes a display configured to display an image; a metal bezel surrounding an outer perimeter of the display; a temperature sensor configured to measure a temperature of an object via the metal bezel; and a controller configured to control the display to output the temperature measured using the temperature sensor.

According to another aspect of the resent disclosure, a method of a mobile device is provided. The method includes measuring, by a temperature sensor of the mobile device, via a metal bezel surrounding an outer perimeter of a display of the mobile device, the temperature of an object; and displaying, by the display, the measured temperature.

BRIEF DESCRIPTION OF THE DRAWINGS

The above and/or other aspects, features, and advantages of the present disclosure will become more apparent from the following detailed description, when taken in conjunction with the accompanying drawings in which.

DETAILED DESCRIPTION OF EMBODIMENTS

Figure 1:
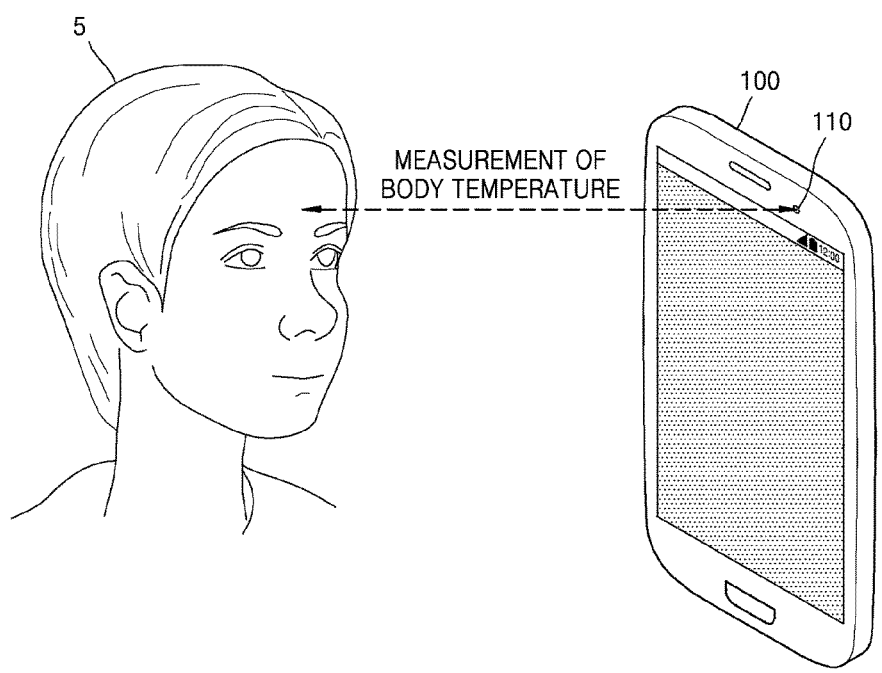
FIG. 1 is a diagram illustrating a method of measuring a temperature using a mobile device including a noncontact-type temperature sensor.

Embodiments of the present disclosure are described in detail with reference to the accompanying drawings. The same or similar components may be designated by the same or similar reference numerals although they are illustrated in different drawings. Detailed descriptions or processes known in the art may be omitted to avoid obscuring the subject matter of the present disclosure.

Expressions such as "at least one of," when preceding a list of elements, modify the entire list of elements, but do not modify the individual elements of the list.

As the present disclosure allows for various changes and numerous embodiments, embodiments will be illustrated in the drawings and described in detail in the description. However, these embodiments do not limit the present disclosure to a particular mode of practice, and the present disclosure encompasses all changes, equivalents, and substitutes that do not depart from the spirit and technical scope thereof. In the accompanying drawings, like reference numerals may refer to the same or similar elements.

Expressions such as "comprise(s)", "include(s)" "may comprise", and "may include," as used herein, refer to the presence of disclosed features, operation, or elements, but do not limit addition of one or more other features, operations, or elements. Furthermore, the terms "comprising", "including", and "having" specify the presence of stated features, numbers, steps, operations, elements, components, and/or a combination thereof but do not preclude the presence or addition of one or more other features, numbers, steps, operations, elements, components, and/or a combination thereof.

Although the terms "first", "second", etc. may be used herein to describe various elements or components, these elements or components are not limited by these terms. For example, these terms do not limit the order or priority among the elements or components unless otherwise indicated. The terms may be used to distinguish one element or component from another element or component. For example, "a first user device" and "a second user device" may both be user devices, but represent different user devices.

For example, a first element or component discussed below could be referred to as a second element or component or vice versa without departing from the teachings of various exemplary embodiments.

It will be understood that when an element is referred to as being "connected" or "coupled" to another element, the element can be directly connected or coupled to the other element, or intervening elements may be present therebetween. By contrast, when an element is referred to as being "directly connected" or "directly coupled" to another element, no other intervening elements are present therebetween.

The terminology used herein is for the purpose of describing particular embodiments only and is not intended to be limiting of embodiments of the present disclosure. Use of singular forms of terms includes plural references as well, unless expressly specified otherwise.

Unless otherwise defined, all terms (including technical and scientific terms) used herein have the same definitions as commonly understood by one of ordinary skill in the art to which embodiments of the present disclosure belong. Terms, such as those defined in commonly-used dictionaries, should be interpreted as having definitions that are consistent with their meaning in the context of the relevant art and will not be interpreted in an idealized or overly formal sense unless expressly so defined herein.

As used herein, a "mobile device" may be a device with a communication function. For example, the "mobile device" may include, for example, at least one of a smartphone, a tablet personal computer (PC), a mobile phone, a video phone, an e-book reader, a laptop PC, a netbook computer, a personal digital assistant (PDA), a portable multimedia player (PMP), an MP3 player, a mobile medical device, a camera, and a wearable device (e.g., a head-mounted device (HMD) such as electronic glasses, electronic clothes, an electronic bracelet, an electronic necklace, an electronic appcessory, an electronic tattoo, a smartwatch, etc.).

A mobile device according to an embodiment of the present disclosure is described in detail as follows with reference to the accompanying drawings. As used herein, a "user" may be a person or device that uses a mobile device (e.g., an electronic device based on artificial intelligence)

FIG. 1 is a diagram illustrating a method of measuring a temperature using a mobile device 100 equipped with a noncontact-type temperature sensor. Examples of the noncontact-type temperature sensor includes a temperature sensor that measures heat radiated by an object, a photoelectric temperature sensor that converts heat radiated by an object into a photoelectric current by using a photoelectric tube and measures the photoelectric current, and an infrared temperature sensor that measures infrared light radiated from an object. Among noncontact-type temperature sensors, infrared temperature sensors are the most widely used sensors. When an infrared temperature sensor 110 is embedded in the mobile device 100 as shown in FIG. 1, the infrared temperature sensor 110 receives infrared radiation emitted by a user 5 and measures a body temperature of the user 5. The infrared temperature sensor 110 selects infrared light in a specific frequency range from light received via a lens and converts the selected infrared light into an electrical signal, thereby measuring the body temperature of the user 5.

However, due to an increasing demand for accurate temperature measurement, the infrared temperature sensor 110 has many limitations when it is built in the mobile device 100. For example, as a thickness of the mobile device 100 decreases, the infrared temperature sensor 110 and a signal processing circuit may be mounted on a single module and packaged together. In this case, the infrared temperature sensor 110 may be affected by heat generated in the infrared temperature sensor 110 itself and the signal processing circuit, and thus, accuracy of temperature measurement by the infrared temperature sensor 110 may be reduced.

To improve sensitivity of the infrared temperature sensor 110, the infrared temperature sensor 110 has to be designed to receive an allowable maximum amount of infrared radiation energy and to prevent the received infrared radiation energy from escaping. However, as the amount of infrared radiation energy incident on the infrared temperatures sensor 110 increases, a temperature of the infrared temperature sensor 110 rises, thereby leading to degradation in accuracy of a temperature measured by the infrared temperature sensor 110. Furthermore, a measurement error occurs in the infrared temperature sensor 110 due to heat generated by a display (e.g. display 210 of FIG. 2) or neighboring components in the mobile device 100.

Thus, according to an embodiment of the present disclosure, a mobile device and a method of operating the mobile device that allow accurate temperature measurement by quickly dissipating heat generated in a temperature sensor while blocking heat generated due to external factors are provided.

Figure 2:
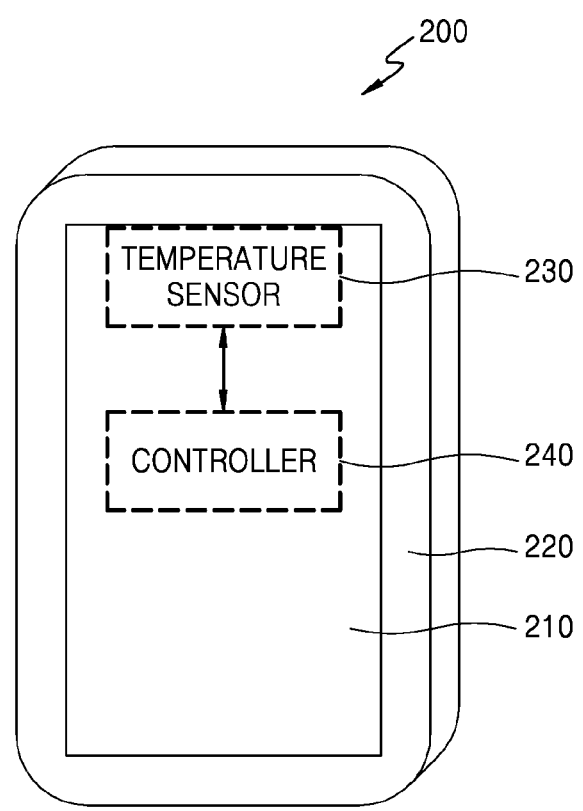
FIG. 2 is a block diagram illustrating a mobile device including a temperature sensor according to an embodiment of the present disclosure.

FIG. 2 is a block diagram illustrating a mobile device including a temperature sensor, according to an embodiment of the present disclosure.

Referring to FIG. 2, a mobile device 200 according to an embodiment of the present disclosure includes a display 210 for displaying an image and a metal bezel 220 disposed around an outer perimeter of the display 210. The mobile device 200 further includes a temperature sensor 230 for measuring a temperature of an object via the metal bezel 220 and a controller 240 for controlling the display 210 to output the temperature measured using the temperature sensor 230. Herein, an "object" may refer to a living or non-living thing whose temperature is to be measured by the mobile device 200. Furthermore, the object may be a body part of a user who uses the mobile device 200, or a body part of a person other than the user.

Although the block diagram of FIG. 2 shows only components related to certain embodiments of the present disclosure, it will be understood by those of ordinary skill in the art that the mobile device 200 may further include components other than those shown in FIG. 2. The components shown in FIG. 2 are described in more detail as follows.

The display 210 may display and output information processed by the mobile device 200. The display 200 may display an image including the information processed by the mobile device 200.

Furthermore, the display 210 may further display a user interface for receiving a user input for controlling the mobile device 200 and a user interface for setting parameters related to temperature measurement.

The display 210 may be a touch screen, in which case the display 210 forms a layer structure with a touch panel for detecting a user's touch gesture thereon. A touch screen may be used as an input device as well as an output device by performing both a function of detecting a user's touch gesture and a function of displaying an image. The display 210 may include, for example, at least one of a liquid crystal display (LCD), a thin-film transistor (TFT)-LCD, an organic light-emitting diode (OLED) display, a flexible display, a three-dimensional (3D) display, and an electrophoretic display.

According to various embodiments of the present disclosure, the mobile device 200 may use the metal bezel 220 disposed around an outer perimeter of the display 210 to achieve an improved exterior design and increased strength. For example, if a surface on which the display 210 of the mobile device 200 is disposed is referred to as a front surface, the metal bezel 220 may be made of chrome (Cr) or copper (Cu) and disposed on an external case having side surfaces enclosing the display 210.

According to various embodiments of the present disclosure, the mobile device 200 may use the metal bezel 220 to form a case that maintains a shape of the mobile device 200. The mobile device 200 may have the metal bezel 220 disposed on an outer surface thereof and the temperature sensor 230 embedded therein, thereby minimizing effects of internal and ambient temperatures due to a thermal equilibrium achieved by the metal bezel 220. According to various embodiments of the present disclosure, the mobile device 200 is configured to quickly dissipate heat generated in the temperature sensor 230 through the metal bezel 220 while blocking externally generated heat, thereby enhancing accuracy of temperature measurement. In the mobile device 200, at least a portion of the case including the metal bezel 220 for maintaining the shape of the mobile device 200, in addition to the metal bezel 220 itself, may be formed of a metal.

According to various embodiments of the present disclosure, the temperature sensor 230 in the mobile device 200 may be a noncontact-type or contact-type temperature sensor. The temperature sensor 230 and a signal processing circuit for receiving a signal related to a temperature detected by the temperature sensor 230 and processing the signal may be packaged together as a single temperature sensor module.

According to an embodiment of the present disclosure, the temperature sensor 230 may be a noncontact-type temperature sensor. For example, the temperature sensor 230 may be an infrared temperature sensor.

According to an embodiment of the present disclosure, the noncontact-type temperature sensor included in the mobile device 200 may be arranged to be in contact with or close to the metal bezel 220, thereby allowing easy dissipation of heat generated in the noncontact-type temperature sensor and minimizing an effect caused by externally generated heat, due to thermal equilibrium achieved by the metal bezel 220.

In detail, according to an embodiment of the present disclosure, the metal bezel 220 may be included in a metal case for accommodating the temperature sensor 230 therein. Thus, heat generated within the temperature sensor 230 may be easily dissipated away from the temperature sensor 230 via the metal bezel 220, and externally generated heat may be blocked by the metal case included in the metal bezel 220, and accordingly, may slightly affect the temperature sensor 230. Thus, the mobile device 200 may reduce errors in temperature measurement by the temperature sensor 230 by using the metal bezel 220.

According to an embodiment of the present disclosure, the temperature sensor 230 may be an infrared temperature sensor. The metal bezel 220 has an opening formed at one side thereof. The temperature sensor 230 may receive light from an object via the opening formed in the metal bezel 220 and measure a temperature of the object based on an infrared component of the received light.

According to another embodiment of the present disclosure, the temperature sensor 230 may be a contact-type temperature sensor. For example, the temperature sensor 230 may measure a temperature by utilizing a property in which electrical resistance of a metal or semiconductor varies with temperature. The temperature sensor 230 may include a thermistor, which is a temperature sensitive semiconductor device whose resistance decreases with increasing temperature.

According to an embodiment of the present disclosure, if the mobile device 200 includes a contact-type temperature sensor, the contact-type temperature sensor may measure a temperature of the object based on heat transferred via the metal bezel 220. In the mobile device 200 according to the present example, it is possible to reduce the amount of heat lost during transfer of the heat from the object to the temperature sensor 230 by measuring the temperature of the object based on heat transferred through the metal bezel 220 made of a metal with high thermal conductivity. Therefore, use of the metal bezel 220 in the mobile device 200 may reduce errors in temperature measurement by the temperature sensor 230.

According to an embodiment of the present disclosure, the temperature sensor 230 may measure a temperature of the object that is in contact with a contact portion that is a part of the metal bezel 220.

Figure 3:
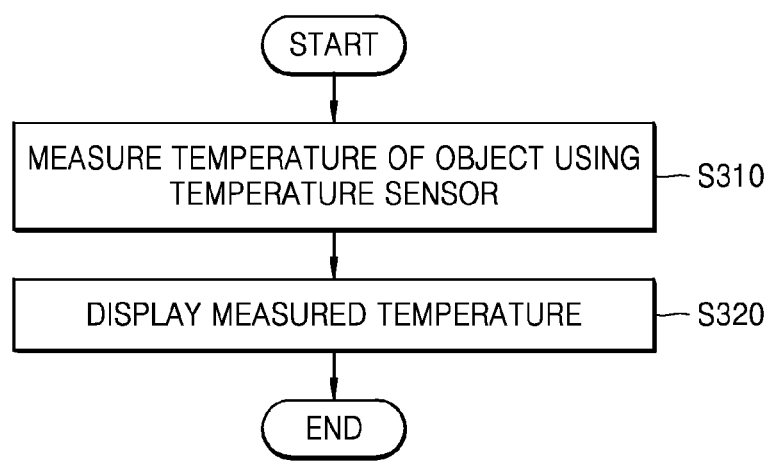
FIG. 3 is a flowchart illustrating a method of operating a mobile device including a temperature sensor according to an embodiment of the present disclosure.

FIG. 3 is a flowchart illustrating a method of operating a mobile device including a temperature sensor according to an embodiment of the present disclosure.

In detail, FIG. 3 illustrates a method of operating the mobile device 200 of FIG. 2 including the metal bezel disposed around an outer perimeter of the display 210 and the temperature sensor 230 for measuring a temperature via the metal bezel 220 according to an embodiment of the present disclosure.

Since operations of the method shown in FIG. 3 may be performed by their corresponding components of the mobile device 200 of FIG. 2, the same descriptions of these operations as provided herein above with respect to FIG. 2 will be omitted for clarity and conciseness.

According to an embodiment of the present disclosure, the mobile device 200 may use the temperature sensor 230 to measure a temperature of an object via the metal bezel 220, in step S310. For example, the mobile device 200 may use infrared radiation, which is received from the object via the opening formed at one side of the metal bezel 220, to measure the temperature of the object. As another example, the mobile device 200 may measure the temperature of the object based on heat transferred through the contact portion that is a part of the metal bezel 220.

The mobile device 200, displays the measured temperature, in step S320. Furthermore, the mobile device 200 may perform various predetermined operations, e.g., by storing the measured temperature, transmitting the measured temperature to an external device, or executing an application based on the measured temperature.

Figure 4:
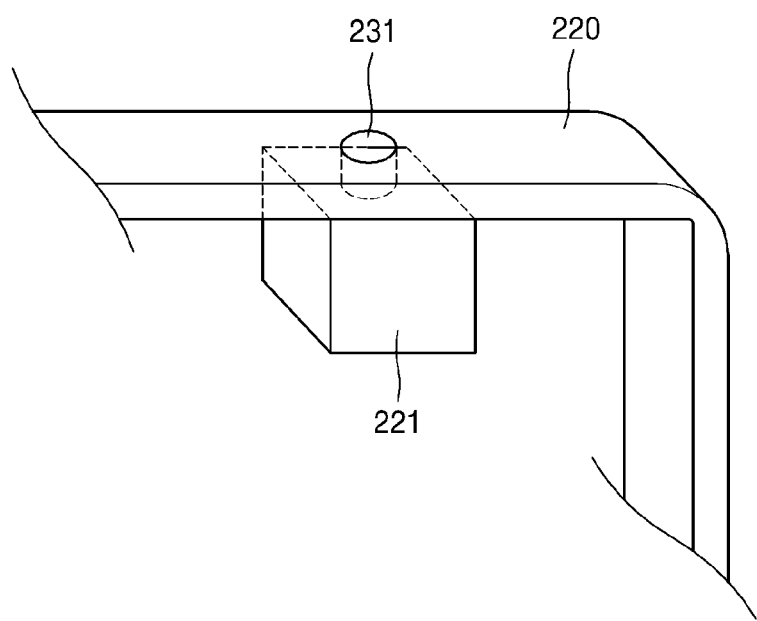
FIG. 4 is a diagram illustrating a metal bezel in a mobile device, which includes a metal case for accommodating a temperature sensor therein, according to an embodiment of the present disclosure.

FIG. 4 illustrates a metal bezel 220 in a mobile device, which includes a metal case 221 for accommodating the temperature sensor (e.g., the temperature sensor 230 of FIG. 2) therein, according to an embodiment of the present disclosure.

Referring to FIG. 4, the metal bezel 220 includes the metal case 221, which contains a space for accommodating the temperature sensor 230.

A portion of one side of the metal bezel 220 is open to form an opening 231 so as to receive light from outside of the mobile device 200. A part of the metal case 221 is exposed through the opening 231. The temperature sensor 230 housed within the metal case 221 may measure a temperature of an object by using light received via the opening 231 or heat radiated therethrough. In this case, the inside of the metal case 221 accommodating the temperature sensor 230 may be sealed to prevent variations in temperature due to outer air, heat generated by neighboring components, or the like.

An example of an operation of the temperature sensor 230, if the temperature sensor 230 is an infrared temperature sensor according to an embodiment of the present disclosure, is described as follows. The temperature sensor 230 filters out light in a frequency range corresponding to infrared light. The temperature sensor 230 may further include a lens via which a large amount of light may be received. The temperature sensor 230 may detect a temperature of the object from the filtered infrared light.

The metal case 221 serves, not only to protect the temperature sensor 230, but also to absorb heat generated in the temperature sensor 230 and dissipate the heat outside of the mobile device 200. Furthermore, the metal case 221 may be used to reduce errors in temperature measurement performed by the temperature sensor 230, by reducing the amount of external heat generated by neighboring components.

Figure 5:
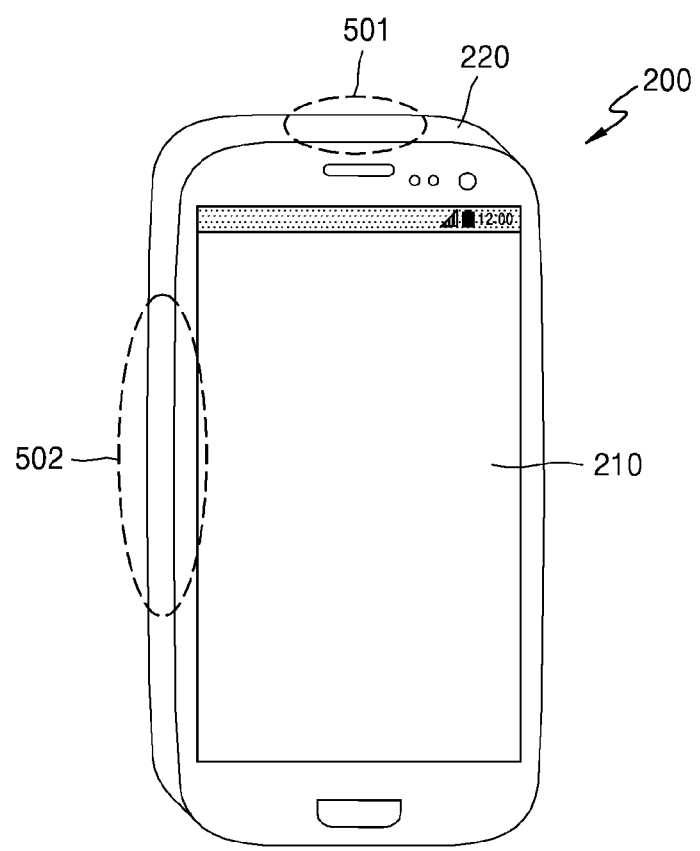
FIG. 5 is a diagram illustrating a location in a mobile device where a noncontact-type temperature sensor is to be disposed, according to an embodiment of the present disclosure.

FIG. 5 is a diagram illustrating a location in a mobile device where a noncontact-type temperature sensor is to be disposed, according to an embodiment of the present disclosure.

Referring to FIG. 5, according to an embodiment of the present disclosure, the temperature sensor 230 may be positioned in contact with or close to one side of the metal bezel 220 positioned along side-surfaces of an external case of the mobile device 200 (e.g., a mobile phone). In the present example, a surface of the mobile device 200 where the display 210 is positioned is referred to as a top surface, and the side surfaces of the external case are surfaces surrounding a perimeter of the top surface. In FIG. 5, for example, the temperature sensor 230, although not shown, may be embedded in the mobile device 200 in contact with or close to a side 501 or 502. As shown in FIG. 4, the metal bezel 220 may include the metal case 221 in which the temperature sensor 230 is accommodated.

Figure 6:
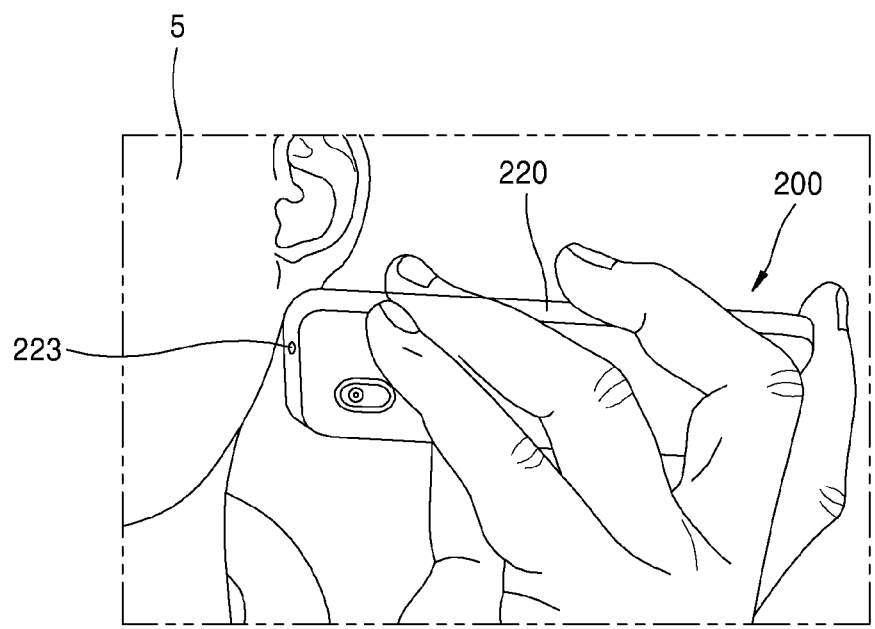
FIG. 6 is a diagram illustrating an example of a method of measuring a body temperature by using a mobile device having a noncontact-type temperature sensor disposed in a side surface thereof, according to an embodiment of the present disclosure.

FIG. 6 is a diagram illustrating an example of a method of measuring a body temperature by using a mobile device having a noncontact-type temperature sensor disposed in a side-surface thereof, according to an embodiment of the present disclosure.

Referring to FIG. 6, according to an embodiment of the present disclosure, a mobile device 200 includes a metal bezel 220 and a noncontact-type temperature sensor. As shown in FIG. 6, the metal bezel 220 in the mobile device 200 has an opening 223 formed at one side thereof and via which the noncontact-type temperature sensor receives heat or light from an object.

A user may measure a temperature of the object by placing the opening 223 toward the object whose temperature is to be measured. FIG. 6 illustrates an example where a user 5 measures a body temperature via a user's face by positioning the opening 223 toward his face.

According to an embodiment of the present disclosure, the temperature sensor 230 may measure a temperature by using light received from the object. When measuring temperature by using light, the temperature sensor 230 may include a lens to accurately measure temperature even when receiving light from a nearby object, increase a range of light received by the temperature sensor 230 (i.e., a field of view (FOV) of the temperature sensor 230), and receive a large amount of light.

Even when the temperature sensor 230 includes a lens, a measurement error may occur due to fine dust or moisture adhering to the lens exposed outside the mobile device 200. Thus, the mobile device 200 may include a protective cover that is positioned on the metal bezel 220 to protect the lens included in the temperature sensor 230.

For example, according to an embodiment of the present disclosure, the mobile device 200 may include an openable/closable or removable protective cover positioned on the metal bezel 220. The mobile device 200 may use the protective cover to open and close the opening 223 via which the temperature sensor 230 is exposed outside. Thus, the user 5 of the mobile device 200 may open the protective cover to expose the lens to elements outside of the mobile device 100, when measuring a temperature and close the cover to shield the lens from elements outside of the mobile device 100, when the temperature sensor 230 is not measuring the temperature. This configuration may protect a lens and reduce a measurement error due to adhesion of fine dust particles or moisture.

Figure 7:
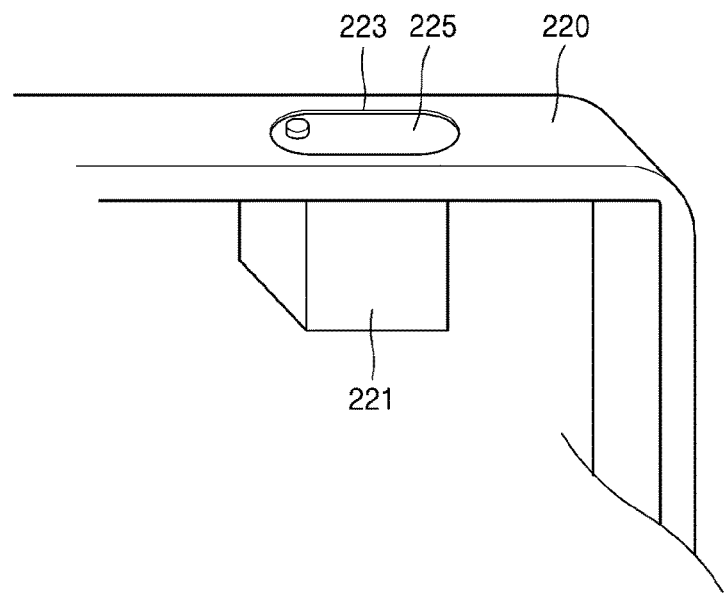
FIGS. 7 and 8 are diagrams illustrating an example of a mobile device including a protective cover for protecting a temperature sensor, according to an embodiment of the present disclosure.
Figure 8:
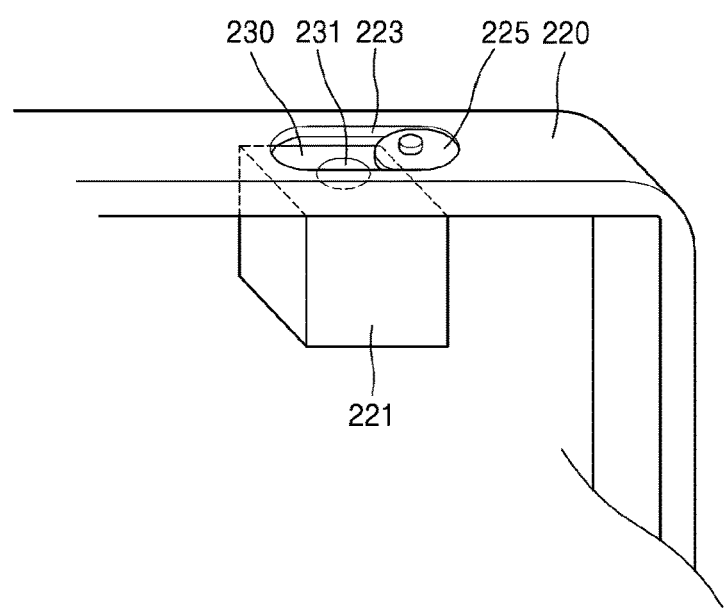

FIGS. 7 and 8 are diagrams that illustrate an example of a mobile device that includes a protective cover for protecting a temperature sensor, according to an embodiment of the present disclosure.

Referring to FIGS. 7 and 8, according to an embodiment of the present disclosure, the mobile device 200 includes a slidable protective cover 225. However, embodiments of the present disclosure are not limited thereto, and the mobile device 200 may include, on the metal bezel 220, a protective cover that is removable or openable and closable in various ways in accordance with embodiments of the present disclosure.

As shown in FIG. 7, the mobile device 200 includes the protective cover 225 that is able to open or close an opening 223 formed in a top surface of a metal case 221, in which the temperature sensor 230 is accommodated. According to an embodiment of the present disclosure, the mobile device 200 allows a user to close the protective cover 225 when not measuring a temperature, thereby shielding a lens exposed via the opening 223 from the outside. Thus, the lens may be protected, and measurement errors due to adhesion of fine dust particles or moisture may be reduced.

Referring to FIG. 8, the mobile device 200 allows the user to open the protective cover 225 during temperature measurement, thereby exposing the temperature sensor 230 via the opening 223. The temperature sensor 230 may measure a temperature of the object by receiving light or heat from the object via a lens 231.

The mobile device 200, including the protective cover 225 disposed on the metal bezel 220, may detect opening/closing of the protective cover 225 and inform the user of a detection result. For example, the mobile device 200 may detect opening/closing of the protective cover 225 based on a temperature measured by the temperature sensor 230.

Figure 9:
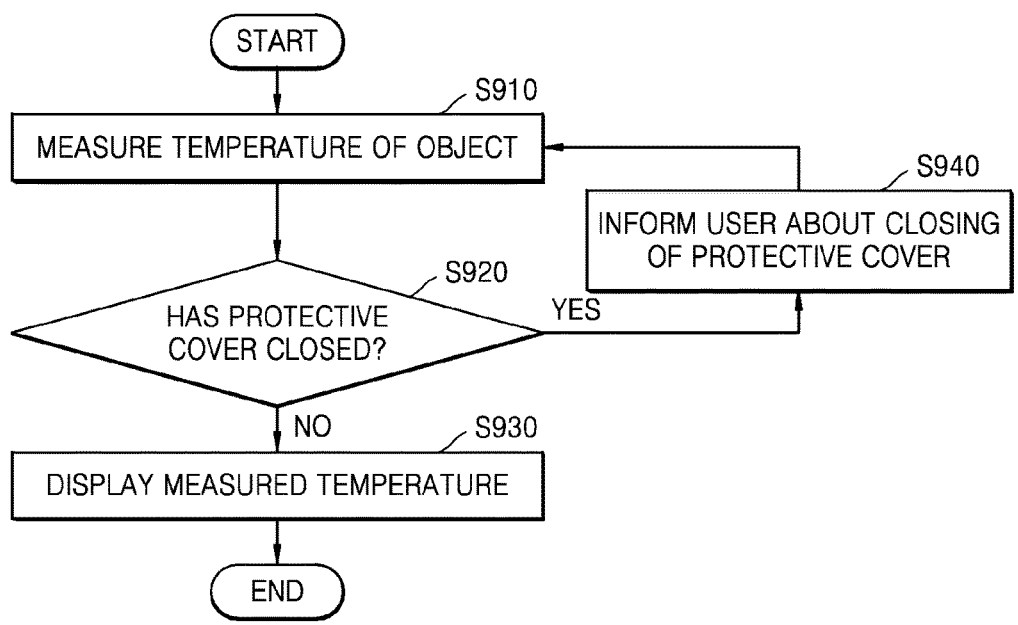
FIG. 9 is a flowchart illustrating a method of operating a mobile device based on opening or closing of a protective cover, according to an embodiment of the present disclosure.

FIG. 9 is a flowchart illustrating a method of operating a mobile device based on opening or closing of a protective cover, according to an embodiment of the present disclosure.

Referring to FIG. 9, when a user executes an application for measuring temperature, the controller 240 of the mobile device 200 of FIG. 2 controls the temperature sensor 230 to measure a temperature of an object. The temperature sensor 230 measures the temperature of the object based on a control signal received from the controller 240, in step S910.

In step S920, the mobile device 200 determines whether the protective cover 225 of FIG. 7 has opened or closed based on a result of the measurement obtained in step S910. For example, if the temperature measured by the temperature sensor 230 is less than or equal to a threshold value, the mobile device 200 determines that the protective cover 225 has been closed. The threshold value may be predetermined experimentally.

If the protective cover 225 has closed, the temperature sensor 230 may measure a temperature of the protective cover 225 based on heat or light received from the protective cover 225. According to an embodiment of the present disclosure, the metal bezel 220 including the protective cover 225 may be kept at a temperature less than or equal to a room temperature due to thermal equilibrium. For example, if the temperature measured by the temperature sensor 230 is less than or equal to 20° C., the mobile device 200 may determine that the protective cover 225 has closed.

However, if it is determined, in step S920, that the protective cover 225 has opened, the mobile device 200 displays the measured temperature of the object, in step S930.

The mobile device 200 may display the temperature measured in step S910, or re-measure a temperature via a user input or automatically and display the re-measured temperature.

In addition, if it is determined in operation S920 that the protective cover 225 has closed, the mobile device 200, informs the user that the protective cover 225 has closed, in step S940.

According to an embodiment of the present disclosure, the mobile device 200 may further include an output unit for outputting information to the user. The output unit outputs information processed by the controller 240 in the form of at least one of a sound, a vibration, and light. For example, the output unit may include the display 210. Alternatively, the output unit may output a sound or vibration. The mobile device 200 may inform the user via the output unit that the protective cover 225 has closed, by using at least one of sound, vibration, and light.

The mobile device 200 may request the user to open the protective cover by informing the user that the protective cover 225 has closed. For example, the user may physically open the protective cover 225 or input a command so that the mobile device 200 may automatically open the protective cover 225.

According to another embodiment of the present disclosure, the mobile device 200 may include a contact-type temperature sensor.

According to another embodiment of the present disclosure, the mobile device 200 may measure a temperature of an object via a physical contact.

Figure 10:
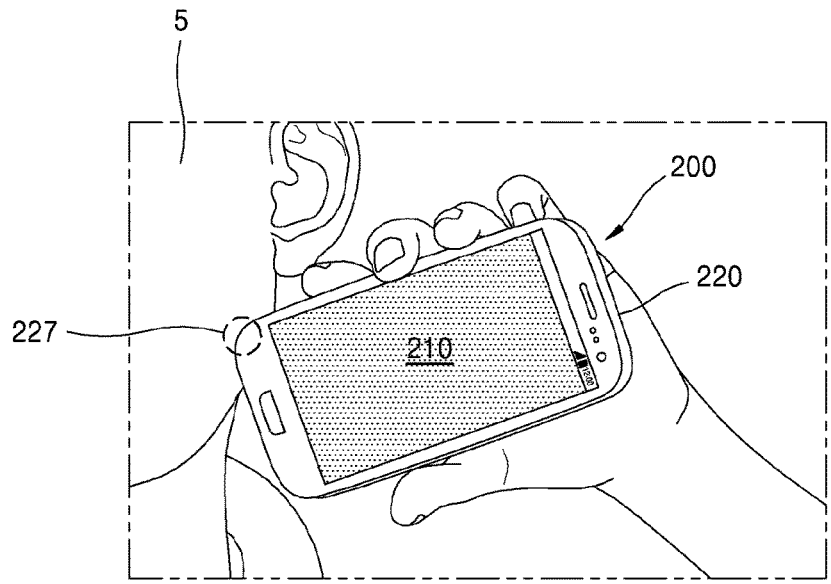
FIG. 10 is a diagram illustrating an example of a method of measuring a body temperature by using a mobile device having a contact-type temperature sensor disposed in a side surface thereof, according to an embodiment of the present disclosure.

FIG. 10 is a diagram illustrating an example according to an embodiment of the present disclosure in which a user measures a temperature from the user's face.

Referring to FIG. 10, the user 5 may measure a temperature via the user's face by bringing a contact portion 227 that is a part of the metal bezel 220 into contact with the user's face.

Figure 11:
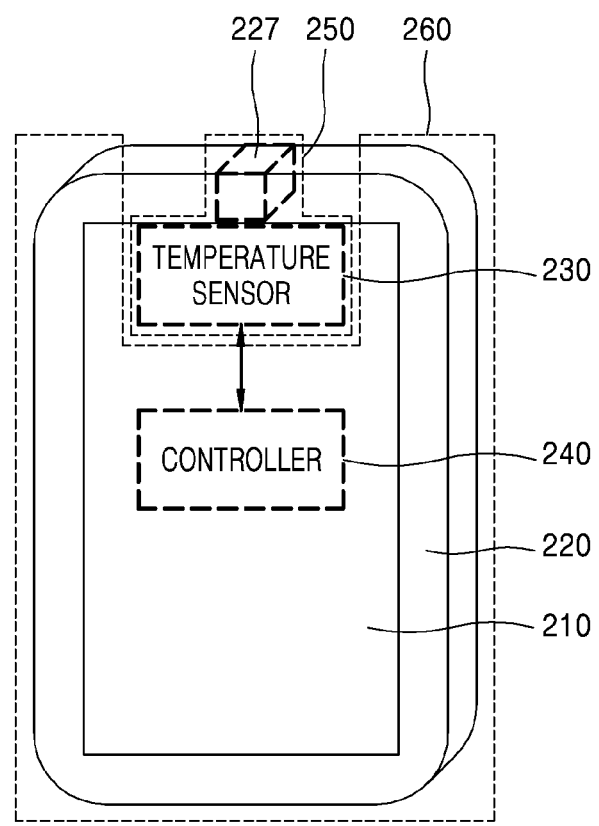
FIG. 11 is a block diagram illustrating a mobile device including a contact-type temperature sensor according to another embodiment of the present disclosure.

FIG. 11 is a block diagram illustrating a mobile device including a contact-type temperature sensor according to another embodiment of the present disclosure.

Referring to the example of FIG. 11, a mobile device 200 according to an embodiment of the present disclosure includes a display 210 for displaying an image and a metal bezel 220 disposed around an outer perimeter of the display 210. The mobile device 200 furthers include a temperature sensor 230 for measuring a temperature of an object via the metal bezel 220 and a controller 240 for controlling the display 210 to output the temperature measured by the temperature sensor 230. Descriptions with respect to the mobile device 200 FIG. 2 are applicable to descriptions of the corresponding components of the mobile device 200 of FIG. 11, and thus, are not repeated for clarity and conciseness.

The temperature sensor 230 may measure a temperature via a contact portion 227, which is a part of the metal bezel 220. The mobile device 200 may measure the temperature of an object that is in contact with the contact portion 227. The mobile device 200 may reduce the amount of heat lost during transfer of the heat from the object to the temperature sensor 230 by measuring the temperature of the object based on heat transferred through the metal bezel 220, which is made of a metal with a high thermal conductivity.

The mobile device 200 further includes a temperature measuring device 250 including the temperature sensor 230 and the contact portion 227, and a main body 260 including the remaining components other than the components of the temperature measuring device 250. For example, the main body 260 includes the display 210 and the controller 240.

The temperature measuring device 250 may be attached to or detached from the main body 260. If the temperature measuring device 250 is removably attached to the main body 260, the temperature measuring device 250 may be separated from the main body 260 and brought into contact with the object, thereby measuring a temperature of the object.

The temperature measuring device 250 may wirelessly transmit the measured wirelessly to the main body 260. Alternatively, the temperature measuring device 250 may transmit the measured temperature to the main body 260 when the temperature measuring device 250 is attached to the main body 260.

Figure 12:
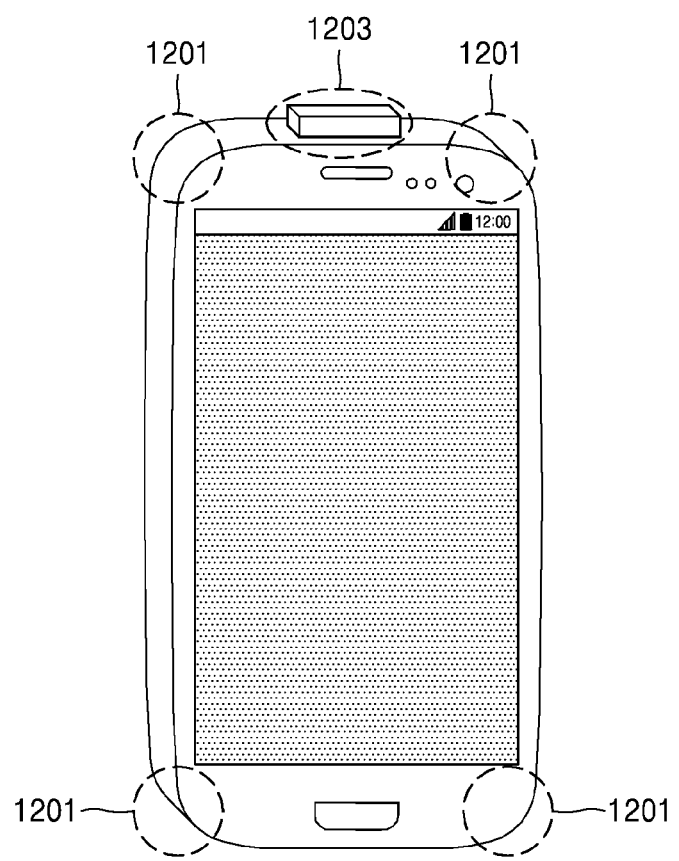
FIG. 12 is a diagram illustrating a location in a mobile device where a contact-type temperature sensor is to be disposed, according to another embodiment of the present disclosure.

FIG. 12 is a diagram illustrating a location in a mobile device including a contact-type temperature sensor, according to another embodiment of the present disclosure.

Referring to the example of FIG. 12, according to an embodiment of the present disclosure, an edge 1201 of the metal bezel 220, or at least a portion of a protruding surface 1203 of the metal bezel 220, may be used as a contact portion 227 (e.g., the contact portion 227 of FIG. 10). The temperature sensor 230 may be embedded within the mobile device 200 so that the temperature sensor 230 is close to or in contact with the contact portion 227 and detect a temperature of an object based on heat transferred via the contact portion 227. The temperature sensor 230 may be built into the mobile device 200 close to or in contact with the edge 1201 or the protruding surface 1203 of the metal bezel 220. This positioning may allow the contact portion 227 to come into contact with the object more conveniently and accurately, thus facilitating convenient and accurate temperature measurement.

The temperature measuring device 250 may be attached to or detached from the main body 260.

Figure 13:
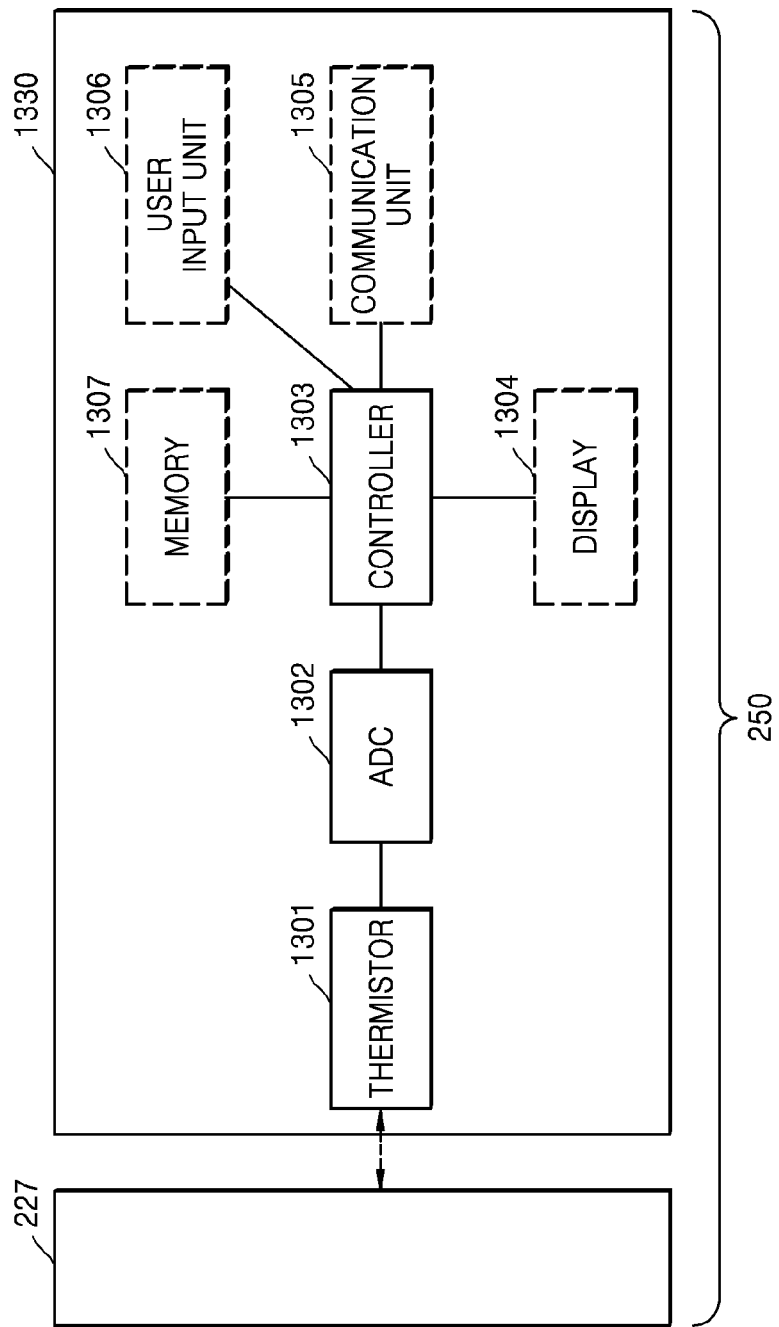
FIG. 13 is a block diagram illustrating a temperature measuring device according to an embodiment of the present disclosure.

FIG. 13 is a block diagram of a temperature measuring device according to another embodiment of the present disclosure.

Referring to FIG. 13, according to an embodiment of the present disclosure, a temperature measuring device 250 includes a contact-type temperature sensor for detecting temperature by using a thermistor whose resistance varies with temperature. However, embodiments are not limited thereto, and the temperature measuring device 250 may include various other types of temperature sensors in accordance with embodiments of the present disclosure.

Referring to FIG. 13, when the temperature measuring device 250 is attached to the main body 260, the temperature measuring device 250 includes a contact portion 227 that is a part of the metal bezel 220. The temperature measuring device 250 may receive heat from an object via the contact portion 227.

The temperature measuring device 250 includes a thermistor 1301, an analog-to-digital converter (ADC) 1302, and a controller 1303. The thermistor 1301, the ADC 1302, and the controller 1303 may correspond to the temperature sensor 230 of FIG. 11, and perform all or some of the functions performed by the temperature sensor 230.

As shown in FIG. 13, the temperature measuring device 250 further includes a display 1304, a communication unit 1305, a user input unit 1306, and a memory 1307. The components of the temperature measuring device 250 will now be described with reference to FIG. 13.

The thermistor 1301 may have a resistance that varies based on heat transferred via the contact portion 227. While FIG. 13 schematically shows the temperature measuring device 250 including the thermistor 1301, the temperature measuring device 250 may further include a resistor coupled to the thermistor 1301. For example, the thermistor 1301 may have a terminal on one side thereof, which is connected to a resistor, and a terminal on the other side thereof, which is connected to ground. The resistor may have a terminal on one side thereof, which is connected to the thermistor 1301, and a terminal on the other side thereof, which is connected to a driving power supply.

The thermistor 1301 may be a positive temperature coefficient (PTC) thermistor, whose resistance increases when the temperature increases, or a negative temperature coefficient (NTC) thermistor, whose resistance decreases when the temperature increases. For example, if the thermistor 1301 is an NTC thermistor, the thermistor 1301 has a resistance that decreases when the temperature increases and increases when the temperature decreases. Thus, when the temperature increases, magnitude of a voltage output via the terminal at the one side decreases, and when the temperature decreases, a magnitude of a voltage output via the terminal at the other side increases. The magnitude of the voltage output via the thermistor 1301 may correspond to a temperature of the object measured based on heat transferred via the contact portion 227.

The ADC 1302 may convert the magnitude of the voltage output via the thermistor 1301 into a digital signal.

The controller 1303 may determine a temperature of the object based on heat transferred via the contact portion 227 based on the digital signal output from the ADC 1302. The controller 1303 controls overall operations of the temperature measuring device 250.

If the temperature measuring device 250 includes the user input unit 1306, as shown in FIG. 13, upon receipt of an input command requesting measurement of a temperature via the user input unit 1306, the controller 1303 may control at least one of the thermistor 1301 and the ADC 1302 to detect the temperature. The temperature measuring device 250 may operate as follows, based on the temperature measured based on a user input received via the user input unit 1306.

For example, if the temperature measuring device 250 includes the display 1304, the controller 1303 may control the display 1304 to display a measured temperature. According to another example, if the temperature measuring device 250 includes a communication unit 1305, the controller 1303 may control the communication unit 1305 to transmit the measured temperature to the main body (e.g., the main body 260 of the mobile device 200 of FIG. 11).

According to another example, if the temperature measuring device 250 includes the memory 1307, the controller 1303 may control the memory 1307 to store the measured temperature. When the temperature measuring device 250 is attached to the main body 260, the temperature measuring device 250 may transmit the temperature stored in the memory 1307 to the main body 260.

Figure 14A:
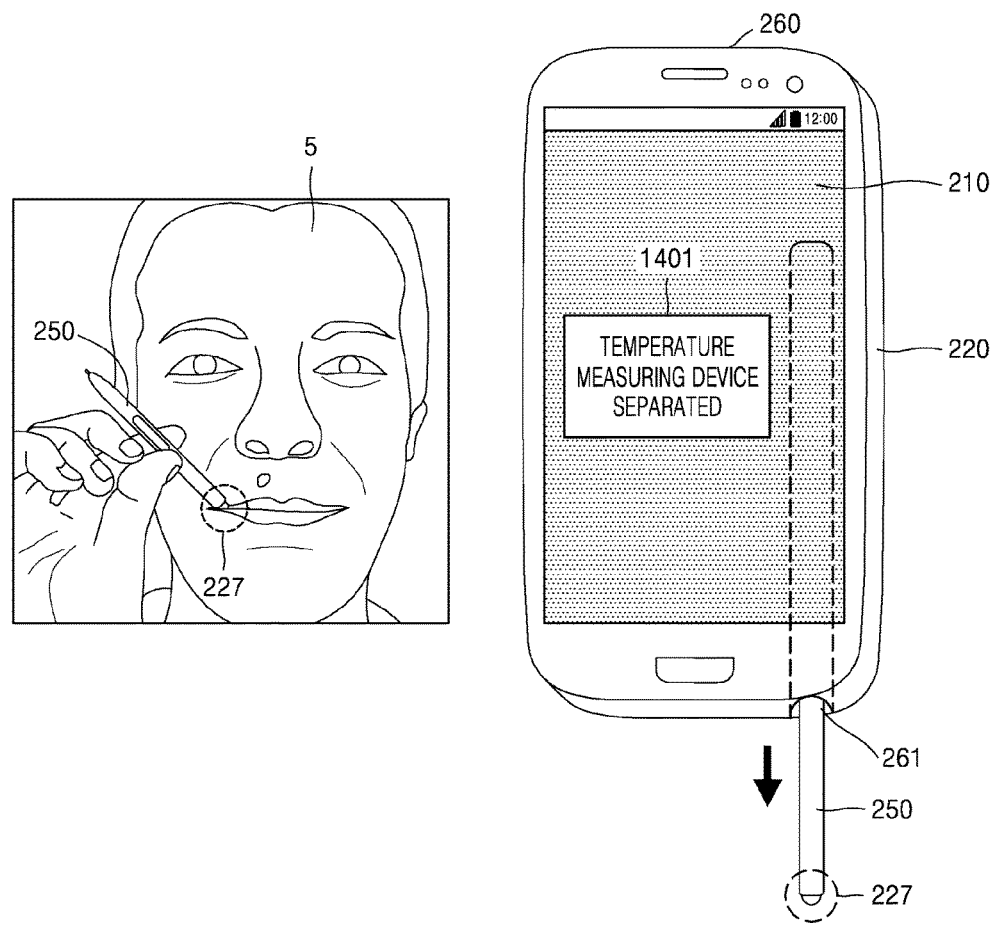
FIGS. 14A, 14B, and 15 are diagrams illustrating an example of a method of operating a mobile device including a removable temperature measuring device, according to another embodiment of the present disclosure.
Figure 14B:
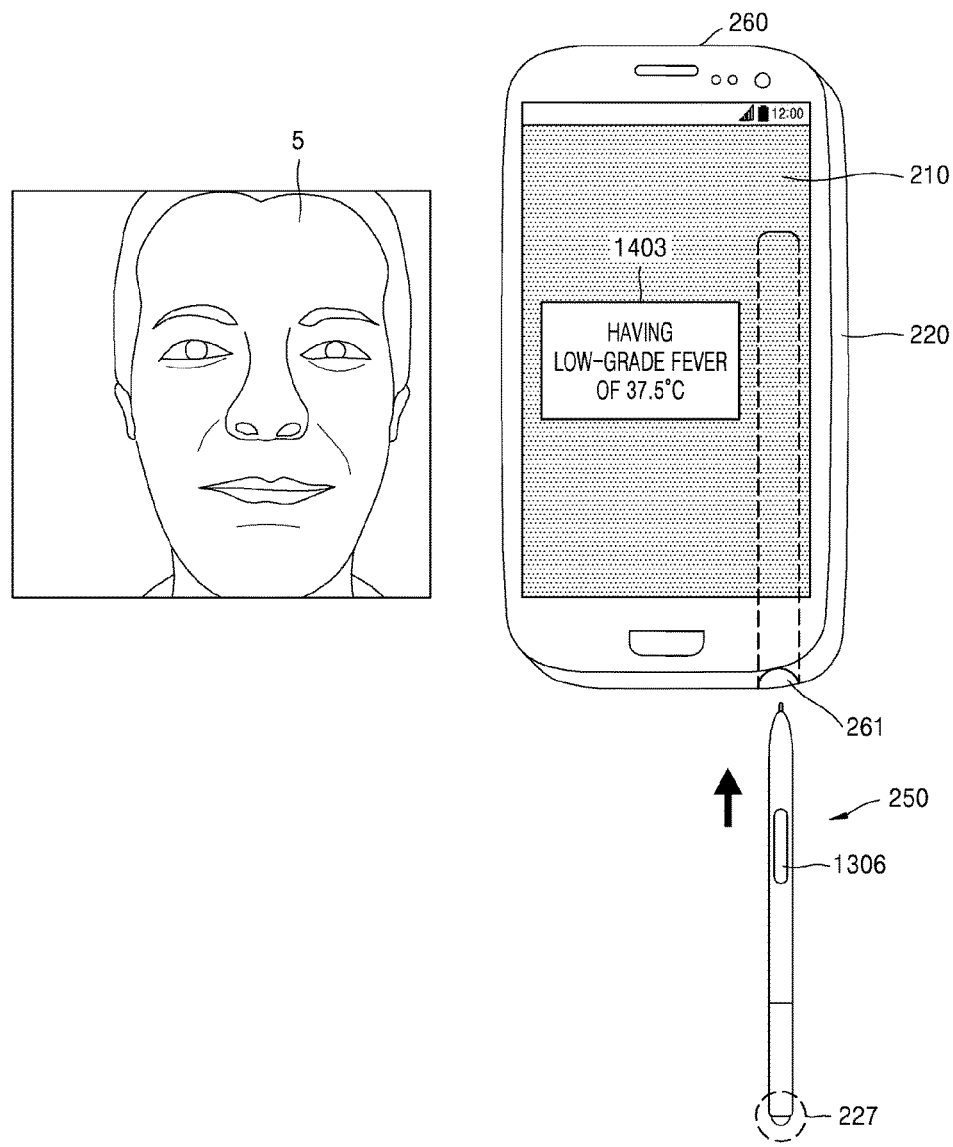
Figure 15:
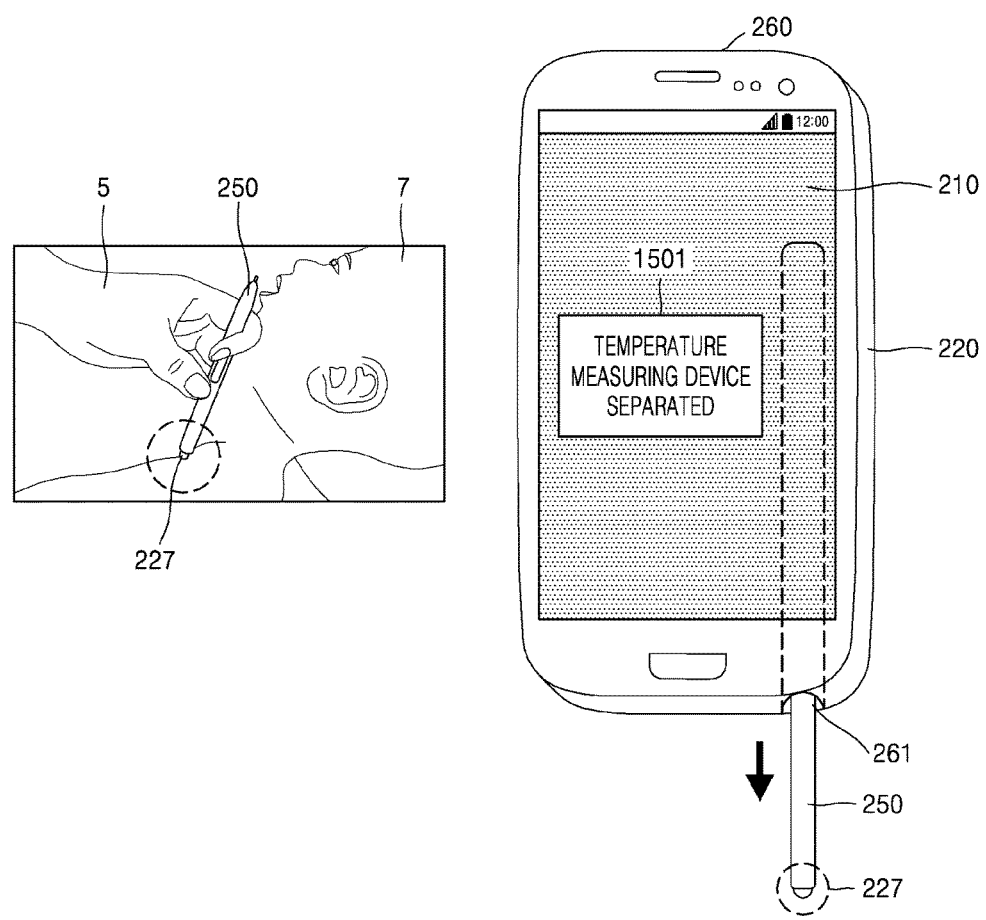

FIGS. 14A, 14B, and 15 illustrate an example of a method of operating a mobile device including a removable temperature measuring device, according to another embodiment of the present disclosure.

Although FIGS. 14A and 14B illustrate an example in which the temperature measuring device 250 has a pen shape, embodiments of the present disclosure are not limited thereto, and the temperature measuring device 250 may have various other shapes in accordance with embodiments of the present disclosure.

Referring to FIG. 14A, the temperature measuring device 250 may be removably attachable to the main body 260. The main body 260 may have a space 261 large enough to accommodate the temperature measuring device 250.

The temperature measuring device 250 includes a contact portion 227 may become a part of the metal bezel 220, via which heat is received from an object, when the temperature measuring device 250 is attached to the main body 260.

As shown in FIG. 14A, when the temperature measuring device 250 is detached from the main body 260, the mobile device 200 may display, via the display 210, an image 1401 informing the user 5 that the temperature measuring device 250 is detached from the main body 260.

FIG. 14A illustrates an example in which a user 5 measures a temperature via a user's mouth. To measure the temperature of the object, the temperature measuring device 250 may be separated from the main body 250 and brought into contact with the user's mouth.

Referring to FIG. 14B, the temperature measuring device 250 may store a measured temperature, and when the temperature measuring device 250 is attached to the main body 260, the temperature measuring device 250 may transmit the measured temperature stored therein to the main body 260. The mobile device 200 may display via the display 210 an image 1403 that provides the user 5 with information about the temperature measured by the temperature measuring device 250.

As shown in FIG. 14B, the temperature measuring device 250 includes a user input unit 306 in the form of a button at one side thereof. Although FIG. 14A illustrates an example in which the user 5 measures a temperature in the user's mouth, embodiments of the present disclosure are not limited thereto, and the mobile device 200 may measure temperatures of various objects in accordance with embodiments of the present disclosure.

Referring to FIG. 15, the temperature measuring device 250 may be removably attachable to the main body 260. The main body 260 has a space 261 accommodating the temperature measuring device 250.

The temperature measuring device 250 includes a contact portion 227, which may become a part of the metal bezel 220, via which heat is received from an object, when the temperature measuring device 250 is attached to the main body 260.

As shown in FIG. 15, when the temperature measuring device 250 is detached from the main body 260, the mobile device 200 may display via the display 210 an image 1501 informing the user 5 that the temperature measuring device 250 is detached from the main body 260.

FIG. 15 illustrates an example in which a user 5 measures a temperature from an armpit of a subject 7 (e.g., a baby being cared for by the user 5). To measure the temperature of the subject 7, the temperature measuring device 250 may be separated from the main body 260 and brought into contact with the subject's armpit.

Figure 16:
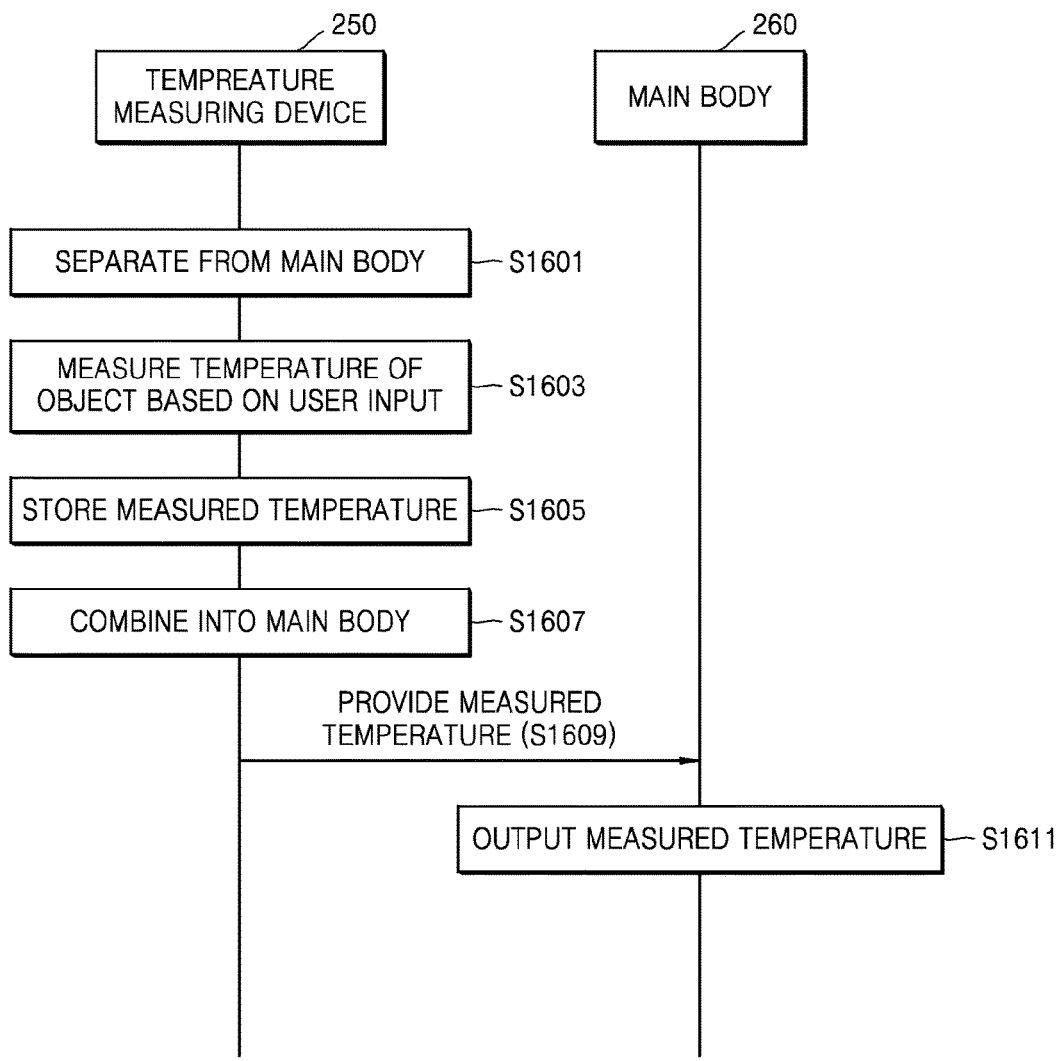
FIG. 16 is a diagram illustrating a signal flow between a temperature measuring device and a main body included in a mobile device, according to an embodiment of the present disclosure.

FIG. 16 is a diagram illustrating a signal flow between a temperature measuring device and a main body included in a mobile device when the temperature measuring device is attachable to or detachable from the main body, according to an embodiment of the present disclosure.

Referring to FIG. 16, the temperature measuring device 250 is separated from the main body 260, in step S1601, and measures a temperature of an object based on a user input, in step S1603. The temperature measuring device 250 stores the measured temperature, in step S1605 and may be combined into (i.e., attached to or inserted into) the main body, in S1607 step. When the temperature measuring device 250 is combined into the main body 260, the temperature measuring device 250 provides the measured temperature to the main body 260, in step S1609. The main body 260 outputs the measured temperature, in step S1611.

Embodiments of the present disclosure are not limited to the embodiment shown in FIG. 16, and the temperature measuring device 250 may wirelessly transmit the measured temperature wirelessly to the main body 260, instead of providing the measured temperature in response to combination into the main body 260, in accordance with embodiments of the present disclosure.

Figure 17:
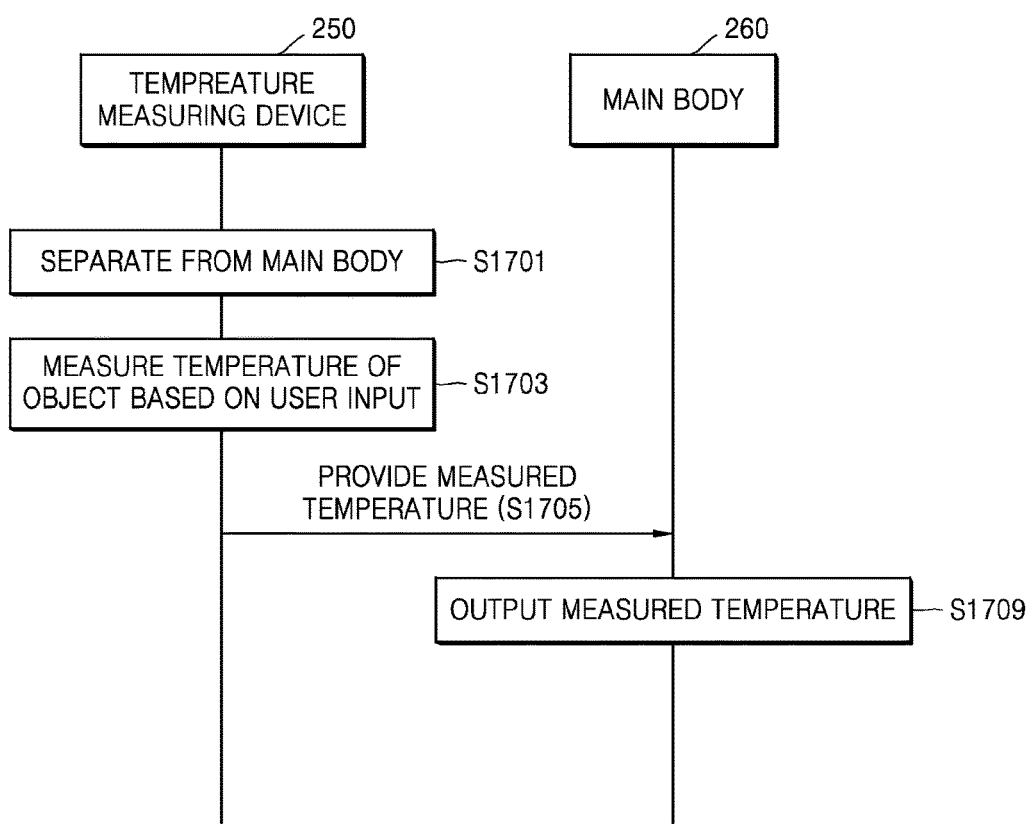
FIG. 17 is a diagram illustrating a signal flow between a temperature measuring device and a main body included in a mobile device, according to another embodiment of the present disclosure.

FIG. 17 is a diagram illustrating a signal flow between a temperature measuring device and a main body included in a mobile device, according to another embodiment of the present disclosure.

Referring to FIG. 17, the temperature measuring device 250 is separated from the main body 260, in step S1701 and measures a temperature of an object based on a user input, in step S1703. The temperature measuring device 250 provides the measured temperature to the main body 260, in step S1705. For example, the temperature measuring device 250 may wirelessly transmit the measured temperature wirelessly to the main body 260. The main body 260 outputs the measured temperature, in step S1709.

Embodiments of the present disclosure are not limited to the embodiments shown in FIGS. 16 and 17, and the temperature measuring device 250 may be configured to measure a temperature from the object as shown in FIG. 10 without being attached to or detached from the main body 260.

Figure 18:
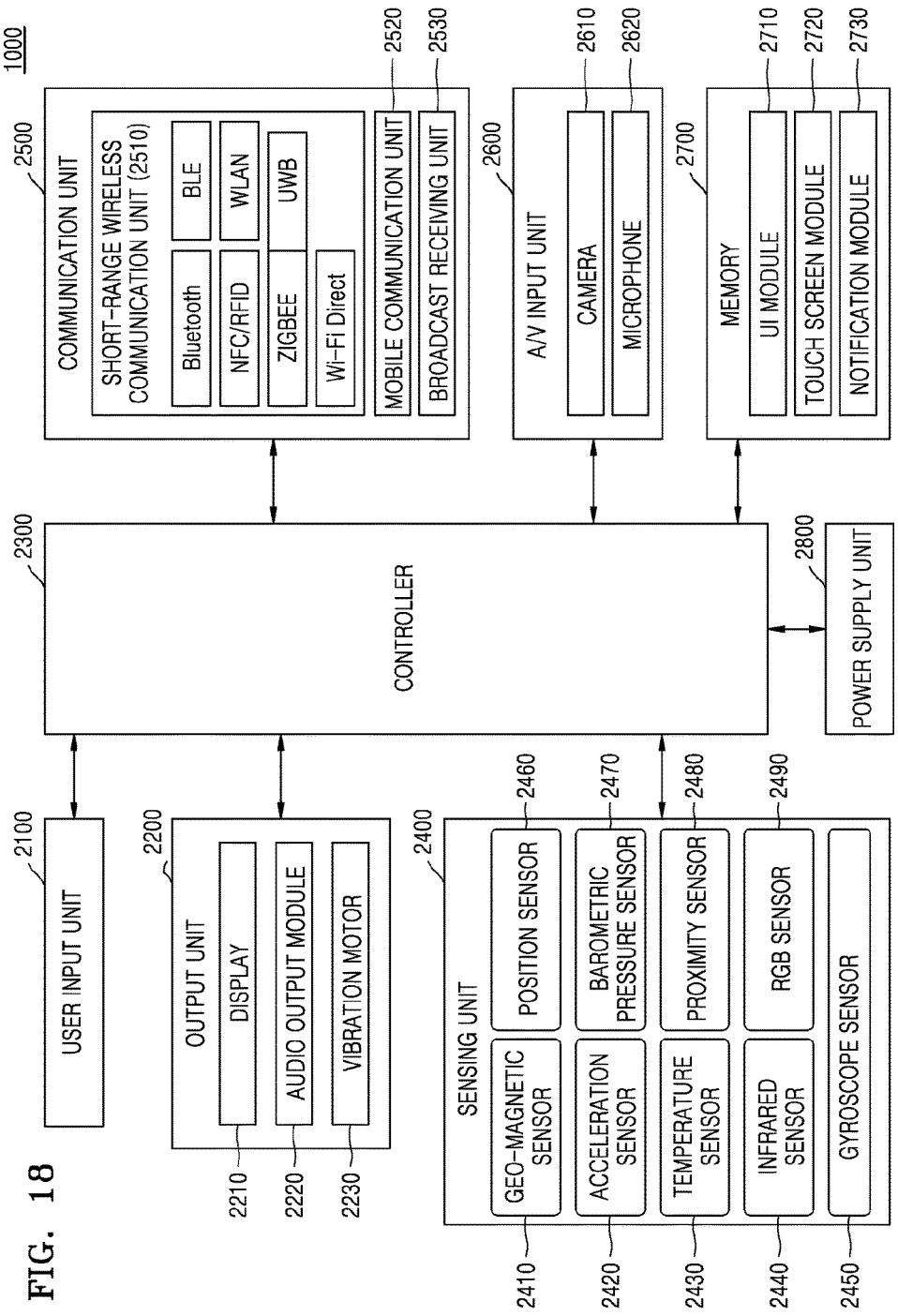
FIG. 18 is a block diagram illustrating a configuration of a general mobile device that can be applied to a mobile device according to various embodiments of the present disclosure.

FIG. 18 is a block diagram illustrating a configuration of a general mobile device 1000 that can be applied to the mobile device 200 according to various embodiments of the present disclosure. The display 210, the temperature sensor 230, and the controller 240 of the mobile device 200 of FIG. 2 may respectively correspond to a display 2210, a temperature sensor 2430, and a controller 2300 of the mobile device 1000 of FIG. 18.

The components shown in FIG. 18 are not all essential components of the mobile device 1000. The mobile device 1000 may include more or fewer components than those shown in FIG. 18 in accordance with embodiments of the present disclosure.

As shown in FIG. 18, the mobile device 200 according to various embodiments of the present disclosure may further include a user input unit 2100, an output unit 2200, a sensing unit 2400, a communication unit 2500, an audio/video (A/V) input unit 2600, a memory 2700, and a power supply unit 2800. The above-described components are connected to one another via a bus.

Referring to FIG. 18, the user inputs data necessary for controlling the mobile device 1000 via the user input unit 2100. Examples of the user input unit 2100 may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, and a jog switch.

The output unit 2200 may output an audio signal, a video signal, or a vibration signal. The output unit 2200 may include the display 2210, an audio output module 2220, and a vibration motor 2230.

The display 2210 may display and output information processed by the mobile device 1000. For example, the display 2210 may display a user interface for receiving a user input for controlling the mobile device 1000 and a user interface for inputting set values related to adjustment of an image being displayed via a head-mounted display (HMD) device.

If the display 2210 and a touch pad are structured in layers to form a touch screen, the display 2210 may be used as an input device as well as an output device. The display 210 may include at least one of an LCD, a TFT-LCD, an OLED display, a flexible display, a 3D display, and an electrophoretic display. The mobile device 1000 may also include two or more displays 2210 according to its implemented configuration.

The audio output module 2220 may output audio data received from the communication unit 2500 or stored in the memory 2700. The audio output module 2220 may also output sound signals associated with functions of the mobile device 1000 (e.g., a call signal reception sound, a message reception sound, and a notification sound). The audio output module 2220 may include a speaker, a buzzer, etc.

The vibration motor 2230 may output a vibration signal. For example, the vibration signal may correspond to an output of audio data or video data (e.g., a call signal reception sound, a message reception sound, etc.). Furthermore, the vibration motor 2230 may output a vibration signal when a touch is input to a touch screen.

In general, the controller 2300 controls overall operations of the mobile device 1000. For example, the controller 2300 may control the user input unit 2100, the output unit 2200, the sensing unit 2400, the communication unit 2500, the A/V input unit 2600, etc. by executing programs stored in the memory 2700.

The sensing unit 2400 may detect a status of the mobile device 1000 or a status of an environment around the mobile device 1000 and transmit the detected status to the controller 2300.

The sensing unit 2400 may include, for example, at least one of a geo-magnetic sensor 2410, an acceleration sensor 2420, a temperature sensor 2430, an infrared sensor 2440, a gyroscope sensor 2450, a position sensor (e.g., global positioning system (GPS)) 2460, a barometric pressure sensor 2470, a proximity sensor 2480, and a red, green, and blue (RGB) sensor 2490 (illuminance sensor). The sensing unit 2400 is not limited to these sensors, and other sensors may be included in accordance with embodiments of the present disclosure. Since functions of the above-described sensors may be inferred intuitively by those of ordinary skill in the art, detailed descriptions thereof are omitted herein for clarity and conciseness.

The communication unit 2500 may include one or more components that enable communication between the mobile device 1000 and the HMD device or between the mobile device 1000 and a server. For example, the communication unit 2500 may include a short-range wireless communication unit 2510, a mobile communication unit 2520, and a broadcast receiving unit 2530.

The short-range wireless communication unit 2510 may include a Bluetooth communication module, a Bluetooth Low Energy (BLE) communication module, a Near Field Communication module, a wireless local area network (WLAN) communication module, a Zigbee communication module, an Infrared Data Association (IrDA) communication module, a Wi-Fi Direct (WFD) communication module, and an Ultra Wideband (UWB) communication module, but is not limited thereto.

The mobile communication unit 2520 transmits and receives wireless signals to and from at least one of a base station, an external terminal, and a server in a mobile communication network. In this case, the wireless signal may be a voice call signal, a video call signal, or data in any one of various formats according to transmission and reception of a text/multimedia message.

The broadcast receiving unit 2530 receives at least one of a broadcast signal and broadcast-related information from the outside via a broadcast channel. The broadcast channel may include a satellite channel, a terrestrial channel, etc. According to an embodiment of the present disclosure, the mobile device 1000 may exclude the broadcast receiving unit 2530.

The A/V input unit 2600 provides an audio or video signal input and may include a camera 2610 and a microphone 2620. The camera 2610 may obtain image frames such as still images or moving images (i.e., video) via an image sensor in a video call mode or a capture mode. Images captured via the image sensor may be processed via the controller 2300 or a separate image processor.

Image frames processed by the camera 2610 may be stored in the memory 2700 or transmitted to the outside via the communication unit 2500. The mobile device 1000 may include two or more cameras 2610 according to various configurations in accordance with embodiments of the present disclosure.

The microphone 2620 may receive an external audio signal and convert the received external audio signal into electrical audio data. For example, the microphone 2620 may receive an audio signal from an external device or a speaking person. The microphone 2620 may use various denoising algorithms for removing noise generated during reception of an external audio signal.

The memory 2700 may store programs necessary for processing or control operations performed by the controller 2300, or store data input to or output from the mobile device 1000.

The memory 2700 may include, for example, at least one storage medium from among a flash memory-type memory, a hard disk-type memory, a multimedia card micro-type memory, card-type memories (e.g., an Secure Digital (SD) card, an eXtreme Digital (XD) memory, and the like), random access memory (RAM), static random access memory (SRAM), read-only memory (ROM), electrically erasable programmable ROM (EEPROM), programmable ROM (PROM), magnetic memory, a magnetic disc, and an optical disc.

The programs stored in the memory 2700 may be classified into a plurality of modules according to their functions. For example, the programs may be classified into a user interface (UI) module 2710, a touch screen module 2720, and a notification module 2730.

The UI module 2710 may provide a specialized UI, a graphical UI (GUI), etc. interworking with the mobile device for each application. The touch screen module 2720 may detect a user's touch gesture on a touch screen and transmit information about the detected touch gesture to the controller 2300. According to some embodiments of the present disclosure, the touch screen module 2720 may recognize a touch code for analysis. The touch screen module 2720 may be formed by separate hardware including a controller.

Various sensors may be placed within or near the touch screen so as to sense a touch or proximity touch on the touch screen. A tactile sensor is an example of the sensors for sensing a touch on the touch screen. The tactile sensor is used to sense a touch of a particular object to the same or greater degree than the degree to which a human can sense the touch. The tactile sensor may detect various pieces of information including the roughness of a contact surface, the hardness of an object to be touched, and the temperature of a point to be touched.

A proximity sensor may also be used as a touch sensor.

A proximity sensor senses the presence of an object that is approaching or is located near a predetermined detection surface by using the force of an electromagnetic field or infrared light without any mechanical contact. Examples of the proximity sensor include a transmissive photoelectric sensor, a direct reflective photoelectric sensor, a mirror reflective photoelectric sensor, a high-frequency oscillation proximity sensor, a capacitive proximity sensor, a magnetic proximity sensor, and an infrared proximity sensor. Examples of a user's touch gesture may include a tap, touch & hold, double-tap, drag, fanning, flick, drag and drop, and swipe.

The notification module 2730 may generate a signal for notifying a user of an occurrence of an event in the mobile device 1000. Examples of such events may include a call signal reception, a message reception, a key signal input, a schedule notification, etc. The notification module 2730 may output a notification signal in a form of a video signal via the display 2210, in a form of an audio signal via the audio output unit 2220, or in a form of a vibration signal via the vibration motor 2230.

The power supply unit 2800 supplies power necessary for operations of the mobile device 1000. The power supply unit 2800 may include a rechargeable battery or a cable or cable port for receiving power from the outside.

Embodiments of the present disclosure may be implemented through computer-readable recording media having recorded thereon computer-executable instructions such as program modules that are executed by a computer. Computer-readable media may include any available media that can be accessed by a computer and may include both volatile and nonvolatile media, including both detachable and non-detachable media. Furthermore, the computer-readable media may include computer storage unit media and communication media. The computer storage unit media include both volatile and nonvolatile and both detachable and non-detachable media implemented by any method or technique for storing information such as computer-readable instructions, data structures, program modules, or other data. The communication media typically embody computer-readable instructions, data structures, program modules, other data of a modulated data signal, or other transmission mechanism, and they include any information transmission media.

The above description is provided for illustration, and it will be understood by those of ordinary skill in the art that various changes in form and details may be made therein without departing from essential features and the spirit and scope of the present disclosure as defined by the appended claims and their equivalents. Accordingly, the above embodiments and all aspects thereof are non-limiting examples. For example, each component defined as an integrated component may be implemented in a distributed fashion. Likewise, components defined as separate components may be implemented in an integrated manner.

While certain embodiments of the present disclosure have been shown and described herein, it will be understood by those skilled in the art that various changes in form and detail may be made therein without departing from the spirit and scope of the present disclosure as defined by the appended claims and their equivalents.

What is claimed is:

1. A mobile device comprising:
   a display configured to display an image;
   a metal bezel surrounding an outer perimeter of the display, and comprising:
      a metal case;
      an opening formed in one side thereof; and
      a protective cover configured to open and close the opening;
   a noncontact-type temperature sensor, accommodated in the metal case, configured to measure the temperature of an object based on an infrared component of light received via the opening; and
   a controller configured to:
      detect opening or closing of the protective cover based on the temperature measured by the noncontact-type temperature sensor; and
      control the display to output the temperature measured using the noncontact-type temperature sensor based on the detecting.

2. The mobile device of claim 1, further comprising an output unit configured to output information to a user of the mobile device,
   wherein, if the temperature measured by the temperature sensor is less than or equal to a threshold value, the controller detects that the protective cover is closed, and controls the output unit to inform the user that the protective cover is closed.

3. The mobile device of claim 2, wherein the output unit informs the user that the protective cover is closed, by using at least one of a sound, a vibration, and light.

4. A method of a mobile device, the method comprising:
   measuring the temperature of an object by a noncontact-type temperature sensor of the mobile device, based on an infrared component of light received via the opening formed in one side of a metal bezel which comprises a metal case configured to accommodate the noncontact-type temperature sensor, a protective cover configured to open and close the opening and is surrounding an outer perimeter of a display of the mobile device;
   detecting opening or closing of the protective cover based on the temperature measured by the noncontact-type temperature sensor; and
   displaying, by a display, the measured temperature based on the detecting.

5. The method of claim 4, wherein detecting opening or closing of the protective cover comprises, if the measured temperature is less than or equal to a threshold value, detecting that the protective cover is closed,
   the method further comprising, if it is detected that the protective cover is closed, informing a user that the protective cover is closed.

6. The method of claim 5, wherein informing the user that the protective cover is closed comprises informing the user that the protective has closed by using at least one of a sound, a vibration, and light.

* * * * *